(12) United States Patent
Moore (10) Patent No.: US 9,004,245 B2
(45) Date of Patent: Apr. 14, 2015

(54) HYDRAULIC BRAKE SYSTEM

(71) Applicant: Wayne-Ian Moore, Changhua County (TW)

(72) Inventor: Wayne-Ian Moore, Changhua County (TW)

(73) Assignee: Ashima Ltd., Changhua County ( * ) Notice: Subject to any disclaimer, the term of this patent is extended or adjusted under 35 U.S.C. 154(b) by 176 days.

(21) Appl. No.: 13/891,202

(22) Filed: May 10, 2013

(65) Prior Publication Data

US 2013/0240313 A1 Sep. 19, 2013

Related U.S. Application Data

(63) Continuation-in-part of application No. 12/907,029, filed on Oct. 19, 2010, now abandoned.

(51) Int. Cl.
| | |
|---|---|
| *F16D 65/14* | (2006.01) |
| *B62L 3/02* | (2006.01) |
| *B60T 17/04* | (2006.01) |
| *B62K 21/12* | (2006.01) |
| *B60T 11/16* | (2006.01) |
| *B62K 25/12* | (2006.01) |
| *B62J 99/00* | (2009.01) |

(52) U.S. Cl.
CPC ............ *B62L 3/023* (2013.01); *B60T 17/04* (2013.01); *B62K 21/12* (2013.01); *B62J 2099/0046* (2013.01); *B60T 11/16* (2013.01); *B62K 25/12* (2013.01)

(58) Field of Classification Search
CPC ..... B60T 11/203; B60T 11/046; B62L 3/023; F16D 2125/60
USPC ............... 188/2 D, 344, 24.11, 24.12, 24.13; 74/500.5, 501.5 H
See application file for complete search history.

(56) References Cited

U.S. PATENT DOCUMENTS

| | | | | |
|---|---|---|---|---|
| 5,632,362 | A * | 5/1997 | Leitner | 188/344 |
| 6,341,673 | B1 * | 1/2002 | Kuo | 188/24.22 |
| 7,249,661 | B2 * | 7/2007 | Becocci et al. | 188/344 |
| 7,938,234 | B2 * | 5/2011 | Jinbo et al. | 188/24.22 |
| 8,783,429 | B2 * | 7/2014 | Moore | 188/344 |
| 2012/0241261 | A1 * | 9/2012 | Tsai | 188/24.21 |
| 2014/0158487 | A1 * | 6/2014 | Moore | 188/344 |
| 2014/0166847 | A1 * | 6/2014 | Moore | 248/674 |
| 2014/0231203 | A1 * | 8/2014 | Chen | 188/344 |

* cited by examiner

*Primary Examiner* — Thomas Irvin (57) ABSTRACT

A hydraulic brake system is adapted to be assembled on a steering assembly. The hydraulic brake system includes a connecting member and hydraulic device. The connecting member has a receiving room and a receiving opening. The hydraulic device has a hydraulic cylinder and a fluid tank. The hydraulic cylinder is received in the receiving room. The fluid tank is inserted in the receiving opening and connected with the hydraulic cylinder. The hydraulic cylinder has a main body, two pistons and two springs. The main body has two hydraulic chambers. The two pistons are assembled in the two hydraulic chambers and two springs sleeve onto the two pistons. Two brake cables and two fluid pipes are connected with the hydraulic cylinder. When the brake cable pulls the piston to press a fluid in the hydraulic chamber, the fluid flows into the fluid pipe so as to control a brake device.

7 Claims, 8 Drawing Sheets

HYDRAULIC BRAKE SYSTEM

CROSS REFERENCE TO RELATED APPLICATIONS

This application is a continuation-in-part of U.S. patent application Ser. No. 12/907,029, filed Oct. 19, 2010.

BACKGROUND OF THE INVENTION

1. Field of the Invention

The present invention relates to a brake system, and more particularly to a hydraulic brake system.

2. Description of Related Art

A conventional brake system has a mechanical structure and is relied on leverage to pull a cable. However, the conventional mechanical system requires a lot of element such that it is inconvenient to assemble the conventional mechanical system. The various elements also cause the conventional mechanical system to be unstable. Furthermore, the conventional mechanical system is simultaneously operated. All elements are operated together such that it takes strenuous strength for a user. Each element is related to other elements such the tolerance and gaps between the elements will consume the braking effect.

A conventional hydraulic brake system includes two brake devices respectively mounted on two handlebars of a bike and two hydraulic devices respectively mounted on the two brake devices. The two brake devices positioned on two handlebars are dominated with a front brake assembly and a rear brake assembly. However, each hydraulic device has hydraulic fluid filling therein such that the two hydraulic devices are heavy. The two hydraulic device are also increased the size of the handlebars. Those are not suitable for the requirement of the light weight bike. Furthermore, the form of the handlebar is adjusted due to the hydraulic device mounted on the handlebar. This costs a lot to re-thread the handlebar and increases a manufacturing fee of each bike. The stability of the structure of the conventional hydraulic brake system is decreased. Besides, the conventional hydraulic brake system is not able to mount on a mountain bike. The mountain bike has a derailleur mechanism mounted on the handlebar. The derailleur mechanism includes a transmission lever and a transmission cable. Therefore, a receiving space of the handlebar is more decreased and is not able to assemble with the conventional hydraulic brake system.

The present invention has arisen to mitigate and/or obviate the disadvantages of the conventional brake system.

SUMMARY OF THE INVENTION

The main objective of the present invention is to provide an improved hydraulic brake system which is extensive utilized in all kinds of bike.

To achieve the objective, a hydraulic brake system which is adapted to be assembled on a steering assembly, the hydraulic brake system comprises a connecting member having a receiving room defined therein and a receiving opening defined at one side thereof, the receiving opening communicating with the receiving room, the receiving room having an opening defined at one end of the connecting member, a hydraulic device having a hydraulic cylinder and a fluid tank, the hydraulic cylinder received in the receiving room via the opening of the receiving room, the fluid tank inserted in the receiving opening of the connecting member and connected with the hydraulic cylinder, the hydraulic cylinder having a main body, two pistons and two springs, the main body having two hydraulic chambers defined therethrough and a guiding channel defined in a top side thereof, the guiding channel communicating with the two hydraulic chambers with one end and communicating with the fluid tank with another end, the two pistons assembled in the two hydraulic chambers of the main body respectively, two springs sleeving onto the two pistons respectively, two brake cables connected with the hydraulic cylinder, each brake cable has one end inserted into each hydraulic chamber and connected with each piston so as to control the movement of each piston relative to each corresponding spring, two fluid pipes connected with a bottom side the hydraulic cylinder, each fluid pipe communicating with each corresponding hydraulic chamber. Wherein, the main body has a protrusion protruded from the top side thereof, the guiding channel being defined through the protrusion, the protrusion inserted into the fluid tank so that the guiding channel communicates with the fluid tank; the main body of the hydraulic cylinder has two posts protruded from a bottom side thereof, each post having a connecting channel defined therethrough, the two connecting channels of the two posts communicating with the two hydraulic chambers respectively, each connecting channel communicating with each corresponding fluid pipe; the connecting member has two holes defined in a bottom side thereof, the two posts being inserted into the two holes so that the hydraulic cylinder is positioned in the connecting member, the hydraulic device has two tube adaptors, each tube adaptor having one end connected with each corresponding post and another end connected with each fluid pipe so that each connecting channel of each post communicates with each corresponding fluid pipe via each tube adaptor; each piston has a piston rod and a piston head, the piston head assembled with one end of the piston rod, each spring sleeving onto the piston rod and abutting against the piston head with one end and against a shoulder of the hydraulic chamber with another end so that when the piston head is pulled by the brake cable, the piston head is moved inwardly so as to press the fluid within the hydraulic chamber; the connecting member has a clamping portion defined at one end thereof, a clamping member cooperating with the clamping portion to clamp the bicycle handlebar, the clamping member being secured to the clamping portion of connecting member by two fastening assemblies, so that the bicycle handlebar is fixed on the connecting member; a lid member disposed in the opening of the connecting member so that an opening of the fluid tank is covered with the lid member.

Under this arrangement, when the brake cable pulls the piston to press a fluid in the hydraulic chamber, the fluid flows into the fluid pipe so as to control a brake device.

Further benefits and advantages of the present invention will become apparent after a careful reading of the detailed description with appropriate reference to the accompanying drawings.

DETAILED DESCRIPTION OF THE INVENTION

Figure 3:
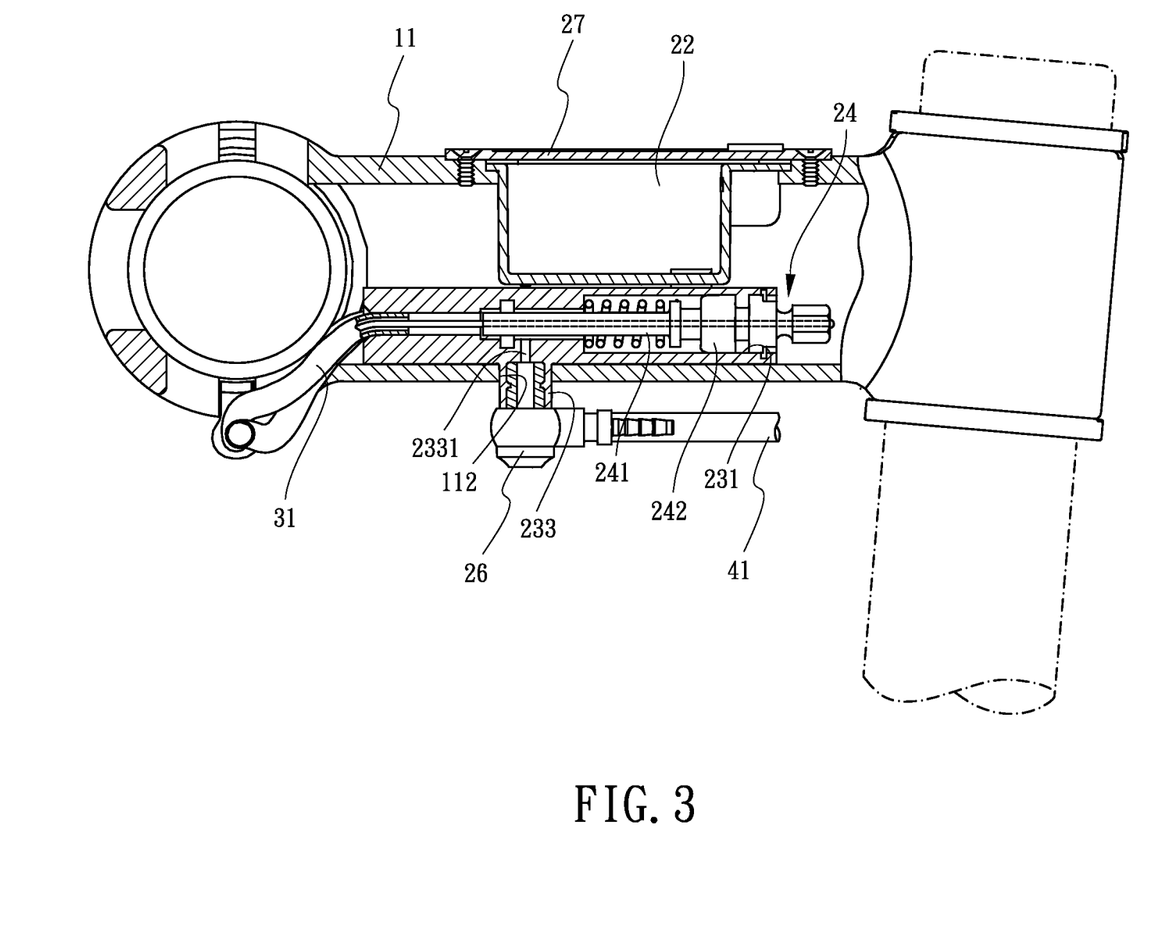
FIG. 3 is a cross-sectional view of the hydraulic brake system along line III-III of FIG. 2.
Figure 4:
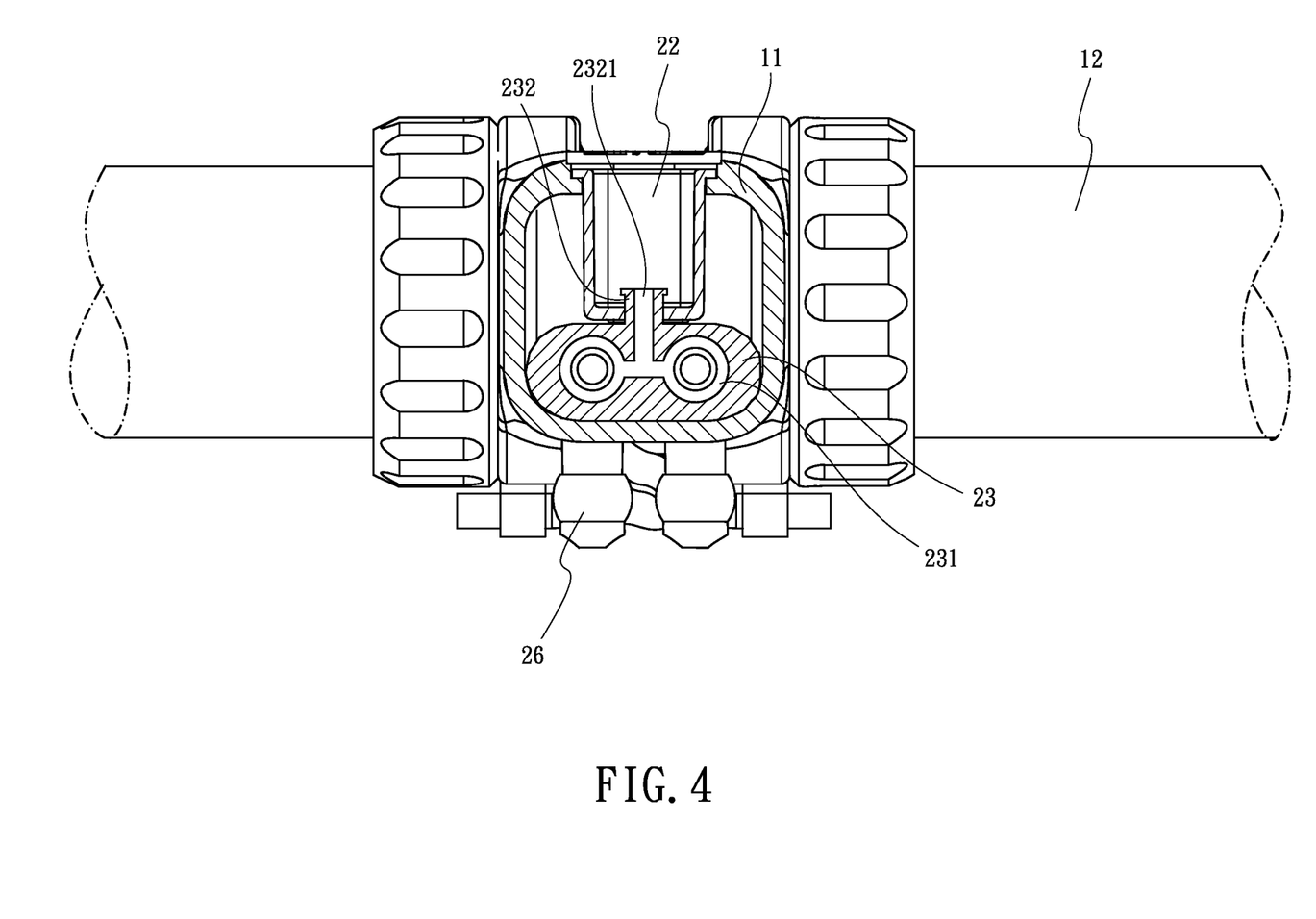
FIG. 4 is a cross-sectional view of the hydraulic brake system along line IV-IV of FIG. 2.
Figure 5:
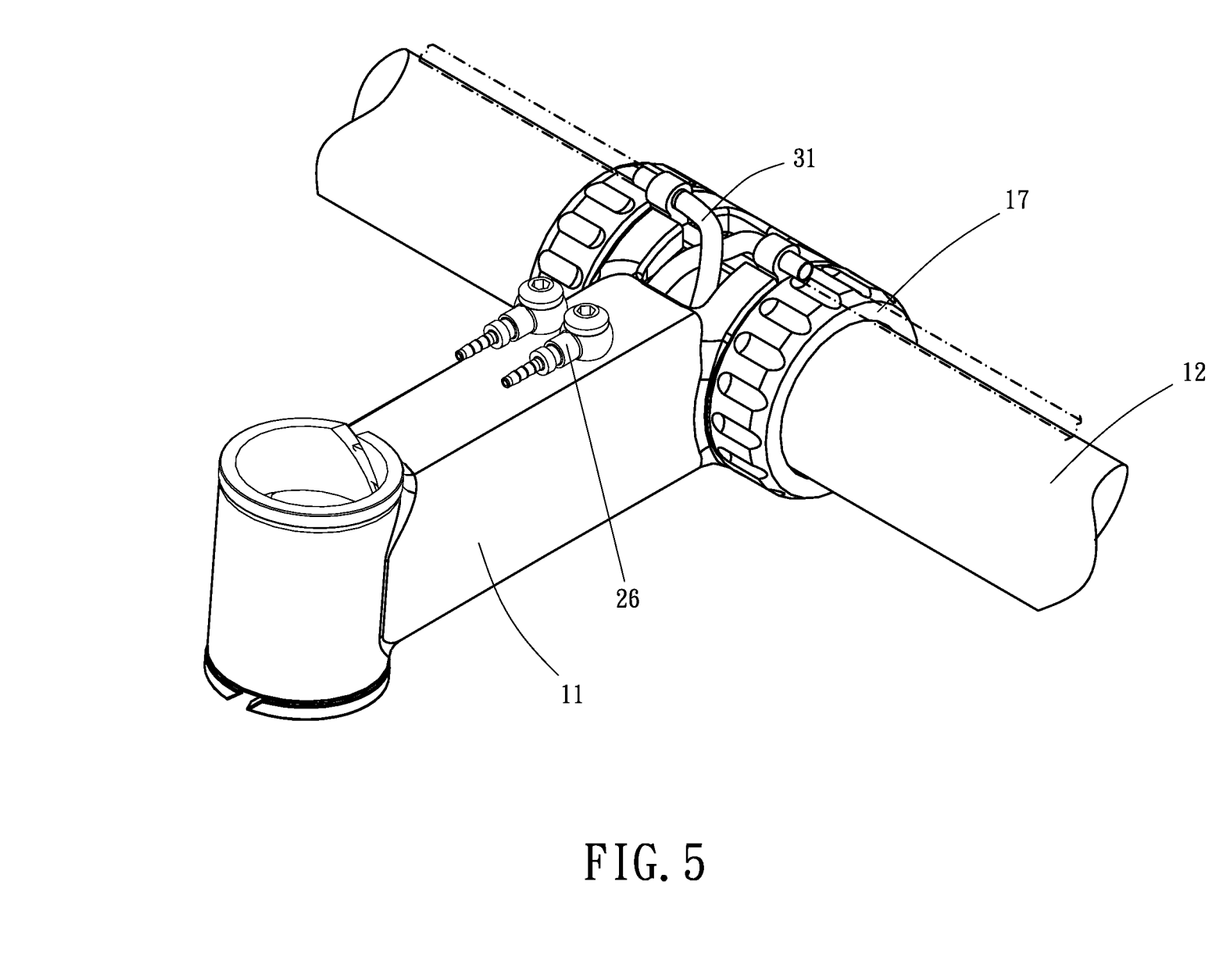
FIG. 5 is another perspective view of the hydraulic brake system of FIG. 2 taken from another angle.
Figure 6:
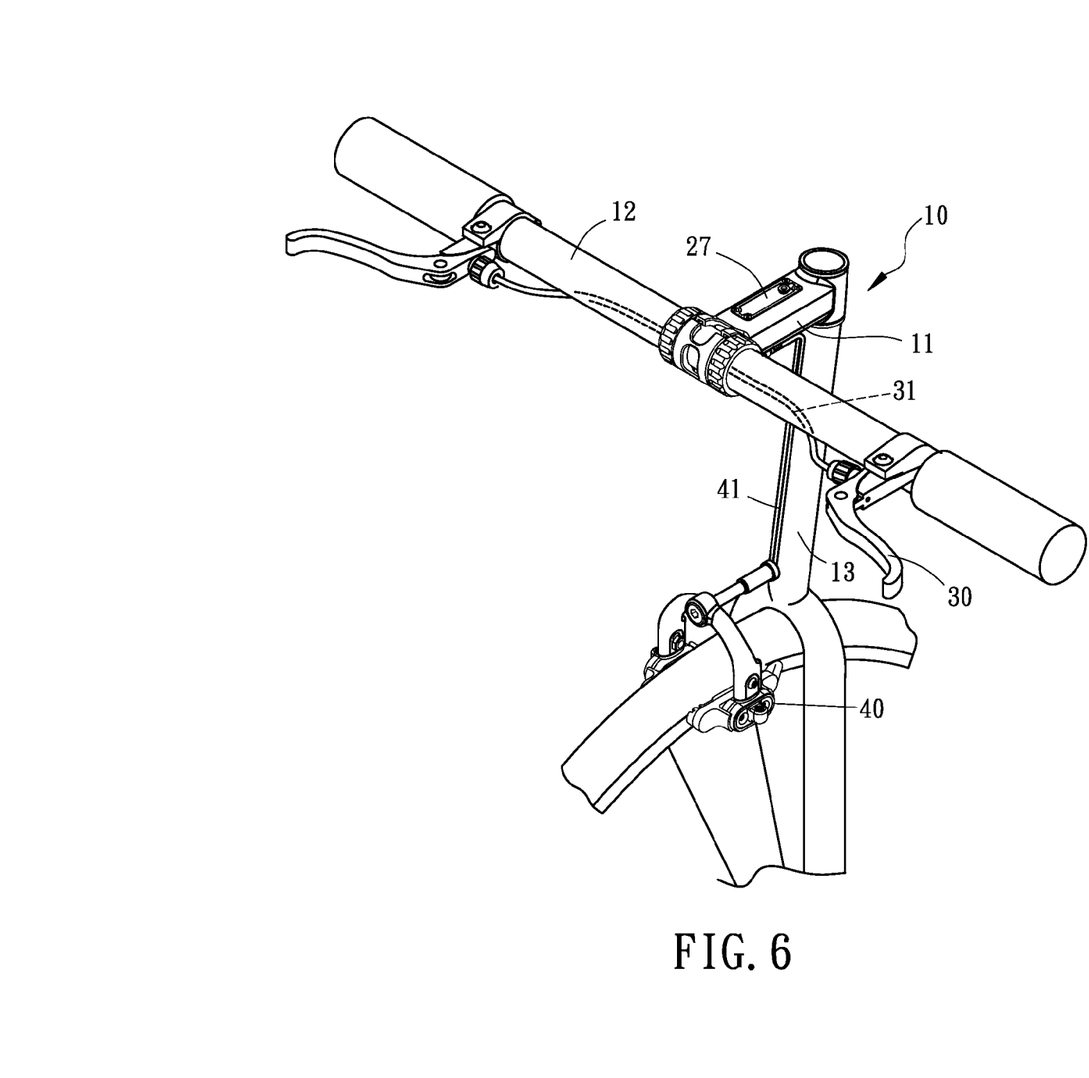
FIG. 6 illustrates that the hydraulic brake system according to the first embodiment is assembled on a steering assembly of a bicycle.

Referring to FIGS. 1-7, a hydraulic brake system of the present invention is adapted to be assembled on a steering assembly 10 of a bicycle which generally includes a bicycle handlebar 12, a head tube 13, a bicycle stem, two brake levers 30, and two brake devices 40, as shown in FIG. 6. The hydraulic brake system comprises a connecting member 11 and a hydraulic device 20. The connecting member 11 connects the bicycle handlebar 12 and the head tube 13. In a preferred embodiment of the present invention, the connecting member 11 is a bicycle stem. The hydraulic device 20 is mounted in the connecting member 11. The connecting member 11 has a receiving room 14 defined therein and a receiving opening 111 defined at a top side thereof. The receiving opening 111 communicates with the receiving room 14. The receiving room 14 has an opening 141 defined at one end of the connecting member 11. The hydraulic device 20 has a hydraulic cylinder 21 and a fluid tank 22. The hydraulic cylinder 21 is received in the receiving room 14 via the opening 141 of the receiving room 14. The fluid tank 22 is inserted into the receiving opening 111 and connected with the hydraulic cylinder 21. The hydraulic cylinder 21 has a main body 23, two pistons 24 and two springs 25. The main body 23 of the hydraulic cylinder 21 has two hydraulic chambers 231 defined therethrough. The two hydraulic chambers 231 are parallel. The main body 23 has a protrusion 232 protruded from a top side thereof and inserted into the fluid tank 22. The protrusion 232 has a guiding channel 2321 defined therethrough. One end of the guiding channel 2321 communicates with the two hydraulic chambers 231 and another end of the guiding channel 2321 communicates with the fluid tank 22, as shown in FIG. 4. The two pistons 24 are assembled in the two hydraulic chambers 231 respectively. The two springs 25 are sleeved onto the two pistons 24 respectively.

Two brake cables 31 are connected with the hydraulic cylinder 21. The two brake cables 31 are respectively inserted in the two hydraulic chambers 231 and connected with the two pistons 24 so as to control the movement of the two pistons 24 relative to the two springs 25, as shown in FIG. 3. The two brake cables 31 are respectively connected to the two brake levers 30 with other ends, as depicted in FIG. 6. Two fluid pipes 41 are connected with a bottom side of the hydraulic cylinder 21 and communicate with the two hydraulic chambers 231 respectively. Each fluid pipe 41 is connected with each corresponding brake devices 40.

Under this arrangement, when a user presses the brake lever 30 to pull the brake cable 31, the brake cable 31 pulls the piston 24 inwardly to press a fluid flowed into the fluid pipe 41 so as to control the brake device 40.

Figures 1, 1A:
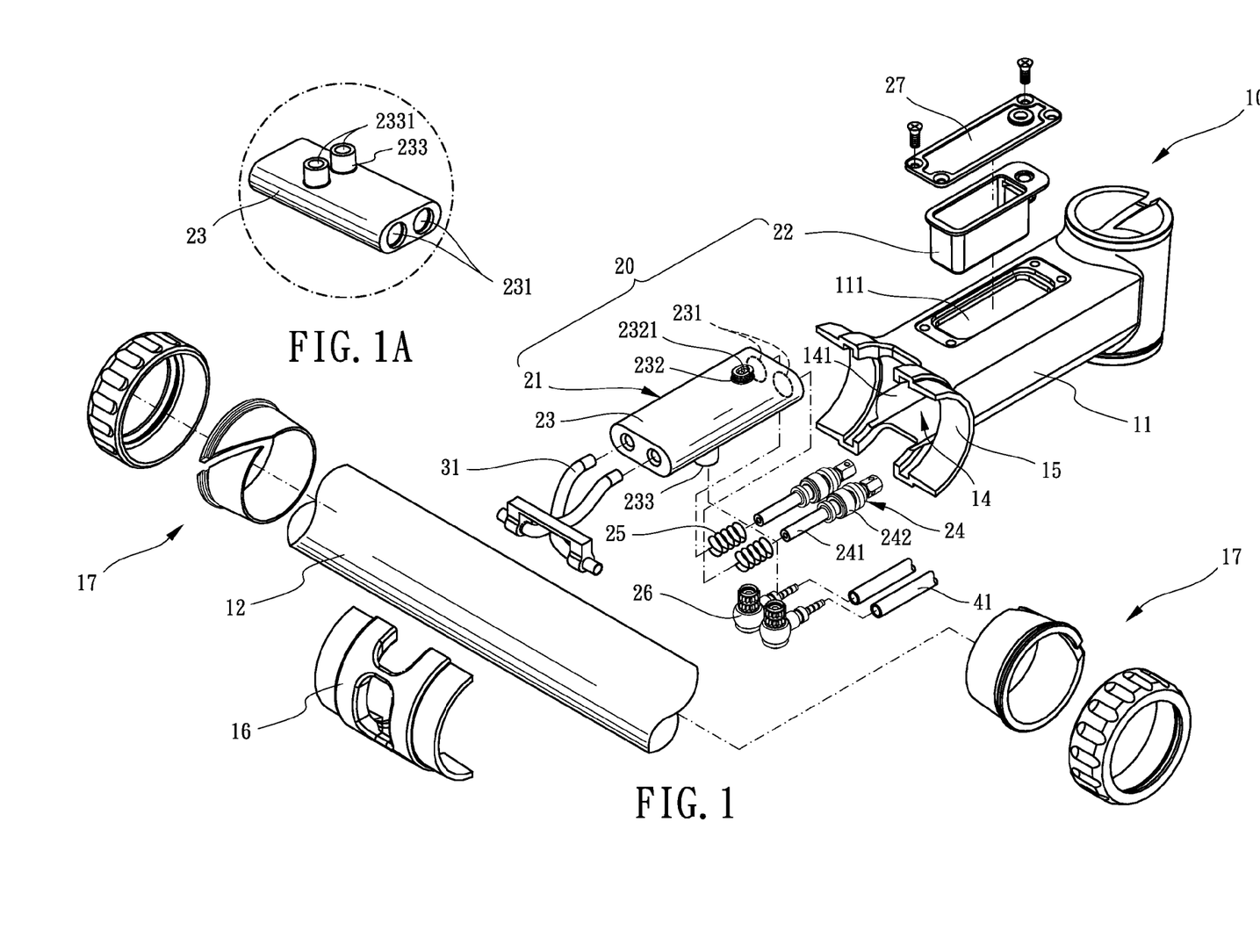
FIG. 1 is an exploded perspective view of a hydraulic brake system according to a first embodiment of the present invention.
FIG. 1A is a perspective view of a main body of the hydraulic brake system of FIG. 1.
Figure 2:
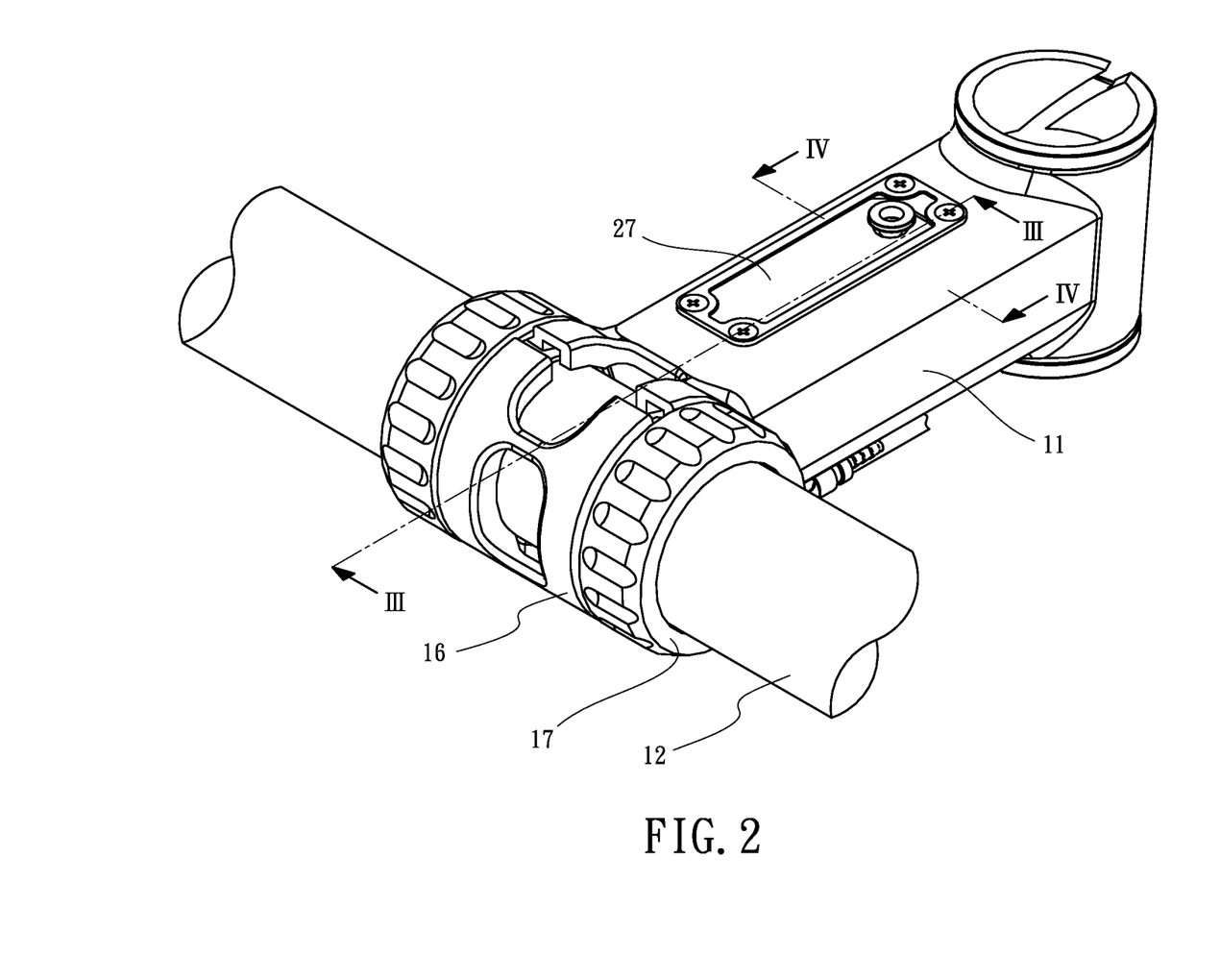
FIG. 2 is a perspective view of the hydraulic brake system of FIG. 1.

Referring to FIG. 1 and FIG. 3, the main body 23 of the hydraulic cylinder 21 has two posts 233 protruded from a bottom side thereof. The connecting member 11 has two holes 112 defined in a bottom side thereof and opposite to the receiving opening 111. The two holes 112 correspond with the two posts 233. The two posts 233 are inserted into the two holes 112 so that the hydraulic cylinder 21 is positioned in the connecting member 11. Each post 233 has a connecting channel 2331 defined therethrough. FIG. 1A is another perspective view for showing the two posts 233 of FIG. 1. The two connecting channels 2331 communicate with the two hydraulic chambers 231 respectively. The hydraulic device 20 has two tube adaptors 26. Each tube adaptor 26 has one end connected with each corresponding post 233 and another end connected with each fluid pipe 41. Therefore, the two connecting channels 2331 communicate with the two fluid pipes 41 via the two tube adaptors 26.

Each piston 24 has a piston rod 241 and a piston head 242. The piston head 242 is assembled with one end of the piston rod 241. Each spring 25 sleeves onto the piston rod 241. Each spring 25 abuts against the piston head 242 with one end and against a shoulder (not numbered) of the hydraulic chamber 231 with another end so that when the piston head 242 is pulled by the brake cable 31, the piston head 242 is moved inwardly so as to press the fluid within the hydraulic chamber 231.

Referring to FIGS. 1-2 and FIGS. 6-7, one end of the connecting member 11 is connected with the head tube 13. Another end of the connecting member 11 has a clamping portion 15 for being assembled with the bicycle handlebar 12. The clamping portion 15 is arc-shaped. The opening 141 of the receiving room 14 is defined at the clamping portion 15. A clamping member 16 cooperates with the clamping portion 15 to clamp the bicycle handlebar 12. The clamping member 16 is secured to the clamping portion 15 of connecting member 11 by two fastening assemblies 17, so that the bicycle handlebar 12 is fixed on the connecting member 11. Furthermore, a lid member 26 is disposed in the opening 111 of the connecting member 11 to cover an opening of the fluid tank 22.

Figure 7:
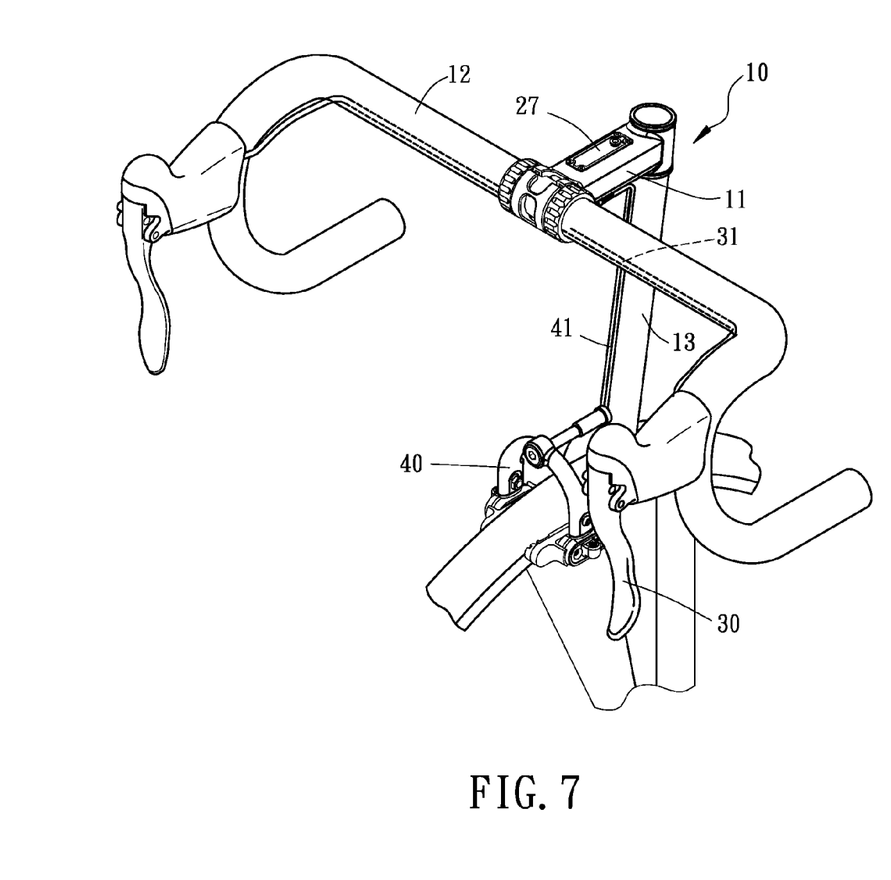
FIG. 7 illustrates the hydraulic brake system according to the first embodiment applied to a racing bike.

Referring to FIG. 7, the hydraulic brake system in accordance with the present invention can also be applied for a racing bike.

Figure 8:
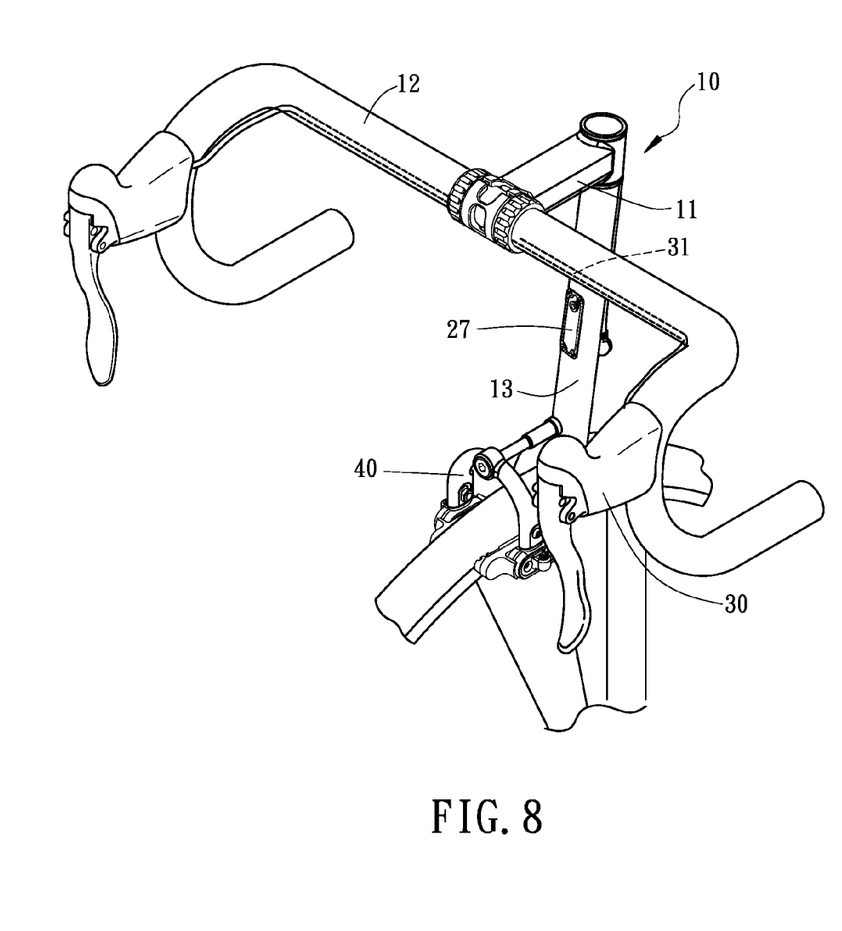
FIG. 8 illustrates the hydraulic brake system according to a second embodiment of the present invention which is assembled in a head tube of the steering assembly.

With reference to FIG. 8, that shows a second embodiment of the hydraulic brake system in accordance with the present invention. The elements and effects of the second embodiment which are the same with the first embodiment are not described, only the differences are described. In the second embodiment, the connecting member is a head tube 13 of the steering assembly 10. Therefore, the hydraulic brake system in accordance with the second embodiment is disposed in the head tube 13.

The hydraulic brake system in accordance with the present invention provides the following advantages:

1. The hydraulic brake system in accordance with the present invention can be utilized on any kind of element of the bicycle steering assembly 10, such as stem or head tube 13. The weight and size of the bike can be reduced.

2. The hydraulic brake system in accordance with the present invention can be utilized on any kind of bike handlebar 12. The handlebar 12 of the bike doesn't need to be modified or changed. A diameter of the handlebar 12 does not need to be adjusted. Therefore, the structural strength and the stability of the bike are enhanced.

3. When a racing bike or a mountain bike utilizes the hydraulic brake system in accordance with the present invention, the brake device 40 and the derailleur of the bike are not necessary to be changed. Therefore, the hydraulic brake system in accordance with the present invention is widely extensive utilized.

Although the invention has been explained in relation to its preferred embodiment, it is to be understood that many other possible modifications and variations can be made without departing from the scope of the invention as hereinafter claimed.

What is claimed is:

1. A hydraulic brake system which is adapted to be assembled on a steering assembly, the hydraulic brake system comprising:
    a connecting member having a receiving room defined therein and a receiving opening defined at one side thereof, the receiving opening communicating with the receiving room, the receiving room having an opening defined at one end of the connecting member;
    a hydraulic device having a hydraulic cylinder and a fluid tank, the hydraulic cylinder received in the receiving room via the opening of the receiving room, the fluid tank inserted in the receiving opening of the connecting member and connected with the hydraulic cylinder, the hydraulic cylinder having a main body, two pistons and two springs, the main body having two hydraulic chambers defined therethrough and a guiding channel defined in a top side thereof, the guiding channel communicating with the two hydraulic chambers with one end and communicating with the fluid tank with another end, the two pistons assembled in the two hydraulic chambers of the main body respectively, two springs sleeving onto the two pistons respectively; and
    two brake cables connected with the hydraulic cylinder, each brake cable has one end inserted into each hydraulic chamber and connected with each piston so as to control the movement of each piston relative to each corresponding spring; and
    two fluid pipes connected with a bottom side the hydraulic cylinder, each fluid pipe communicating with each corresponding hydraulic chamber;
    wherein, when the brake cable pulls the piston to press a fluid in the hydraulic chamber, the fluid flows into the fluid pipe so as to control a brake device.

2. The hydraulic brake system as claimed in claim 1, wherein the main body has a protrusion protruded from the top side thereof, the guiding channel being defined through the protrusion, the protrusion inserted into the fluid tank so that the guiding channel communicates with the fluid tank.

3. The hydraulic brake system as claimed in claim 1, wherein the main body of the hydraulic cylinder has two posts protruded from a bottom side thereof, each post having a connecting channel defined therethrough, the two connecting channels of the two posts communicating with the two hydraulic chambers respectively, each connecting channel communicating with each corresponding fluid pipe.

4. The hydraulic brake system as claimed in claim 3, wherein, the connecting member has two holes defined in a bottom side thereof, the two posts being inserted into the two holes so that the hydraulic cylinder is positioned in the connecting member, the hydraulic device has two tube adaptors, each tube adaptor having one end connected with each corresponding post and another end connected with each fluid pipe so that each connecting channel of each post communicates with each corresponding fluid pipe via each tube adaptor.

5. The hydraulic brake system as claimed in claim 1, wherein each piston has a piston rod and a piston head, the piston head assembled with one end of the piston rod, each spring sleeving onto the piston rod and abutting against the piston head with one end and against a shoulder of the hydraulic chamber with another end so that when the piston head is pulled by the brake cable, the piston head is moved inwardly so as to press the fluid within the hydraulic chamber.

6. The hydraulic brake system as claimed in claim 1, wherein the connecting member has a clamping portion defined at one end thereof, a clamping member cooperating with the clamping portion to clamp the bicycle handlebar, the clamping member being secured to the clamping portion of connecting member by two fastening assemblies, so that the bicycle handlebar is fixed on the connecting member.

7. The hydraulic brake system as claimed in claim 1, further comprises a lid member disposed in the opening of the connecting member so that an opening of the fluid tank is covered with the lid member.

\* \* \* \* \*